United States Patent
Scholze et al.

(10) Patent No.: US 11,484,984 B2
(45) Date of Patent: Nov. 1, 2022

(54) TOOL DEVICE AND METHOD FOR MEASURING A CONDITION OF A MACHINING TOOL

(71) Applicant: Agathon AG, Maschinenfabrik, Bellach (CH)

(72) Inventors: Stephan Scholze, Birmensdorf ZH (CH); Markus Maier, Schaffhausen (CH); Lukas Weiss, Pfäffikon (CH)

(73) Assignee: AGATHON AG, MASCHINENFABRIK, Bellach (CH)

( * ) Notice: Subject to any disclaimer, the term of this patent is extended or adjusted under 35 U.S.C. 154(b) by 0 days.

(21) Appl. No.: 16/679,772

(22) Filed: Nov. 11, 2019

(65) Prior Publication Data

US 2020/0189061 A1 Jun. 18, 2020

(30) Foreign Application Priority Data

Dec. 12, 2018 (CH) .................................... 1531/18

(51) Int. Cl.
- *B23Q 17/24* (2006.01)
- *B23Q 17/09* (2006.01)
- *B24B 49/02* (2006.01)
- *B24B 49/12* (2006.01)

(52) U.S. Cl.
CPC ..... *B23Q 17/2457* (2013.01); *B23Q 17/0952* (2013.01); *B23Q 17/2495* (2013.01); *B24B 49/02* (2013.01); *B24B 49/12* (2013.01)

(58) Field of Classification Search
CPC ............ B23Q 17/0952; B23Q 17/2457; B23Q 17/2495; B24B 49/12
See application file for complete search history.

(56) References Cited

U.S. PATENT DOCUMENTS

| | | | | |
|---|---|---|---|---|
| 5,657,405 A | * | 8/1997 | Fujiwara | G01D 5/268 356/225 |
| 6,023,325 A | * | 2/2000 | Sahlgren | B23Q 17/2495 356/73.1 |
| 6,602,109 B1 | | 8/2003 | Malkin et al. | |
| 2006/0258263 A1 | * | 11/2006 | Barada | B24B 49/12 451/5 |
| 2008/0018907 A1 | * | 1/2008 | Beaulieu | G01B 9/0209 356/482 |
| 2013/0045663 A1 | * | 2/2013 | Galletti | B24B 7/228 451/41 |

FOREIGN PATENT DOCUMENTS

| | | |
|---|---|---|
| CN | 105345663 A | 2/2016 |
| EP | 3106260 A1 | 12/2016 |

* cited by examiner

*Primary Examiner* — Joseph J Hail
*Assistant Examiner* — J Stephen Taylor
(74) *Attorney, Agent, or Firm* — Pearne & Gordon LLP

(57) ABSTRACT

A tool device (1) for machining a workpiece (4) by cutting, milling, drilling or grinding, comprising a sensor (20) for detecting a condition of the tool device (1) during machining, wherein the sensor (20) is connectable to a receiving unit (40), which transmits data to an analysis unit (50) for analyzing the received data. The sensor (20) is configured as a fiber optic sensor (20) comprising at least one optical fiber (26) providing an incident optical path (22) and a reflected optical path (24) for a light beam emitted by a connectable light source (30) and with a distal end thereof lying in a surface (14, 74) of the tool device (1) such that the optical path length can be measured.

14 Claims, 3 Drawing Sheets

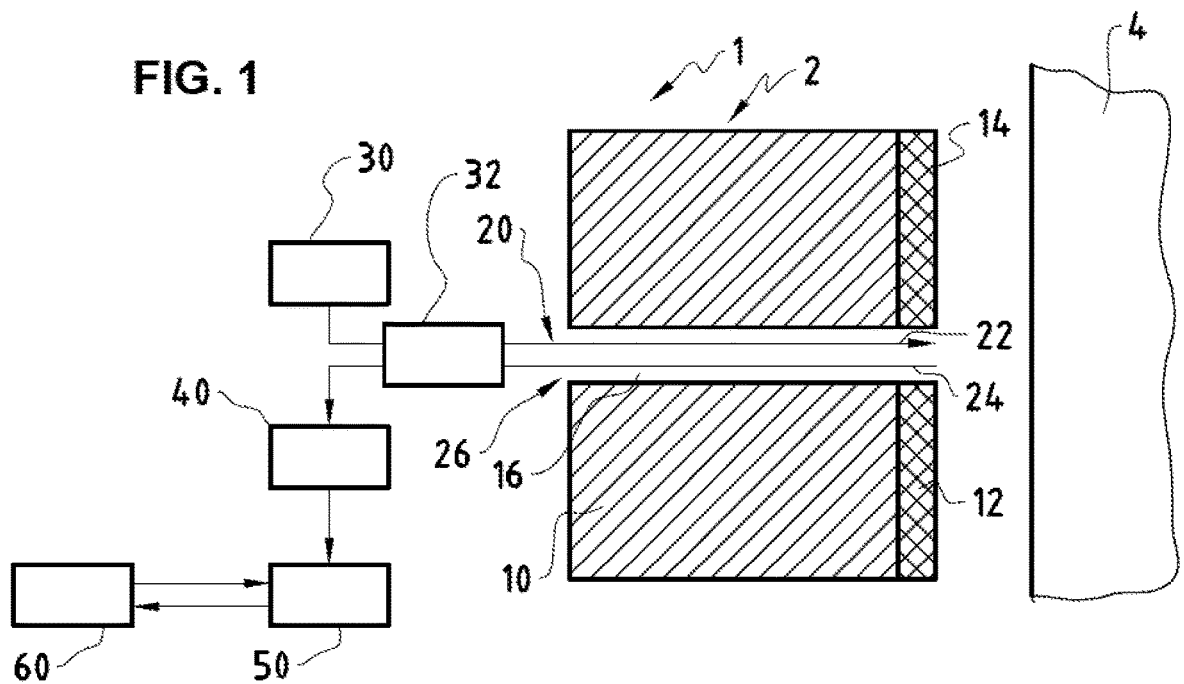
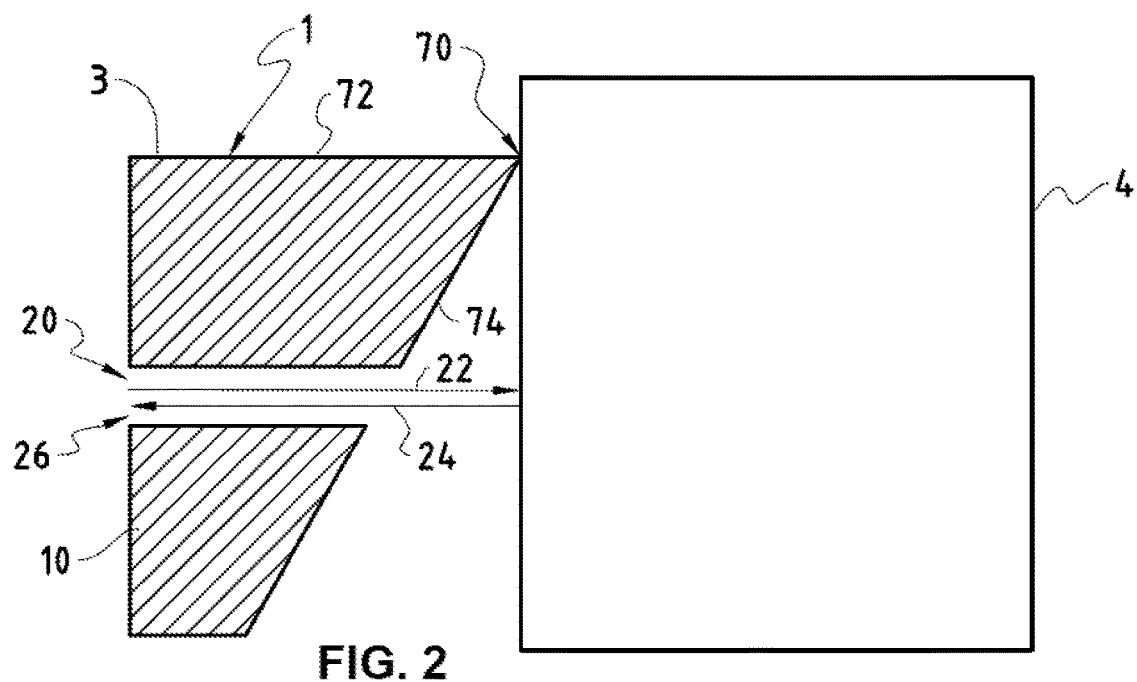

TOOL DEVICE AND METHOD FOR MEASURING A CONDITION OF A MACHINING TOOL

TECHNICAL FIELD

The present invention relates to a tool device and a method capable of measuring a condition of a machining tool such as grinding tool and/or cutting tool during a machining process. The present invention is focused to measure tool wear.

BACKGROUND OF THE INVENTION

In machining processes using machining tools always end up with some kind of wear on them due to cutting action between workpiece and a or multiple tool edges. In particular machining tools influence the productivity and the economy of the machining operation and the quality of the machined products. Many attempts have been made to implement an automatic system to measure tool wear which removes the need for manual inspection and minimizes the time used on wear measurement. Several different methods have been developed to monitor the condition of tools, such as cutting inserts for cutting, milling or drilling or grinding tools, i.e. exchangeable and/or indexable inserts and to predict the tool wear to optimize the tool change intervals or dressing intervals as the tool life is known before the tool is actually rejected. In particular, the tool wear can be described as a change of shape of the tool from its original shape during cutting or grinding resulting from gradual loss of tool material or deformation. For example, for cutting tools the wear is known as flank wear on a major flank, minor flank and/or face of an insert. The methods for tool condition monitoring can be divided according to the sensors used in direct and indirect sensors.

To measure tool wear of tools with geometrically defined cutting edge directly sensors include vision and/or proximity sensors as well as sensors provided directly on the wear surface of the tool. Vision sensor systems rely on the measurement of specular reflection of the wear area from fiber optic lights captured by a camera. Whereby the worn area is usually polished from the grinding effect of machining and allows specular reflection to occur only at the worn area. Proximity sensors estimate the wear by measuring the distance between the workpiece and the tool edge of a cutting tool. Generally, measurements can only be done between machining runs because the area of wear of the tool is not visible during actual machining.

Furthermore, known sensors for on-line measurement of the wear or of temperature of the cutting insert comprise conductor paths embedded in the cutting material forming the cutting edge such that forming a closed and/or an open circuit by connected to external measuring circuitry. Therefore, it is known that tool wear can be measured successively with the aid of a plurality of conductors connected to the cutting edge, since the resistances in the conductors will change gradually and abruptly, depending on the extent to which the conductors are worn away.

EP 3 106 260 A1 discloses cutting inserts in which a sensor for on-line measurement of wear of the cutting insert comprises contact regions through which the sensor is connectable to external measuring circuitry and leads connected to a respective of the contact regions with a free end positioned such that upon predetermined wear caused by the operation of the cutting insert the free ends are connected to each other by the metal workpiece or by a chip resulting from the operation. Therefore, the cutting insert has a sensor in the form of open circuits.

Indirect sensors can only estimate the wear as they have no direct way to measure the actual wear but they rely on secondary effects of the wear. Due to this fact it is state of the art that several process parameters are monitored which are indirect parameters of the cutting edge or abrasive layer to allow for decisions from the view of the process. Process variables are determined in real-time without interrupting the machining process for the control of the machining process. Known are the technologies comprising force monitoring, temperature monitoring, power monitoring, acoustic emission, optical observation, scanning electron microscopy, monitoring of fluid flow characteristics and in particular in grinding processes tactile probing of the surface and magnetic properties of the surface. All these monitoring strategies can be used at least partially during machining to detect the degradation of the wheel and/or tool. But there is a disadvantage that the accuracy of such measurements are impaired by thermal effects and by effects resulting from the atmosphere in the contact area in particular due to the circulating coolant.

Beneath machining processes grinding is one of the most important manufacturing processes, especially in the production of high-precision components. Interaction between surfaces of the grinding tool defines the grinding process and material removal occurs when undefined cutting edges of abrasive grains of a grinding tool are simultaneously in contact with the workpiece, whereby a certain grain penetration into the workpiece is required. During the grinding process mechanical, chemical and thermal loads are applied to the grinding wheel resulting in wear and in a large amount of frictional heat introducing plastic deformation, undesirable changes in the microstructure and residual stress state of the material of the workpiece. For production of high precision components the grinding wheel has to be kept in optimal condition with respect to precision and sharpness. During the grinding process the grinding wheel wears wherein the wear can be classified in macro wear describing deterioration of the macro geometry which may lead to a change in profile, size errors and runout and in micro wear relating to wear on the grain level changing the micro topography of the grinding wheel. Conventionally, the grinding result and the condition of the grinding wheel are only checked after completion of the grinding process or periodically during the grinding process at intervals causing loss of productivity. But still unknown is to determine the exact moment to accomplish the dressing process is a problem without a precise solution.

Inspection of the grinding wheel is to make sure that the abrasive layer of the grinding wheel is sufficiently and sharp enough for grinding. This needs to survey the totality of the abrasive surface since only one bad area can degrade the grinding wheel as uselessness.

From U.S. Pat. No. 6,602,109 a grinding wheel system is known that includes a grinding wheel with at least one embedded sensor in the form of piezoceramic sensors and an adaptor disk attached to the grinding wheel and containing electronics that processes signals produced by each embedded sensor to allow real-time analysis of grinding wheel conditions. The grinding wheel may include at least one force sensor which may be positioned near the grinding wheel periphery to allow indirect measurement of the risk of grinding burns and an acoustic emission sensor which may be positioned near the grinding wheel rim. Using force measurements at different locations to predict the wheel shape only give a relative estimation between the different grinding wheel locations and is furthermore influenced by cooling lubricant or imbalanced wheels as well as on the used material and tool combination. No direct relation between force changing during grinding and changing with process parameters and micro topography of the grinding wheel exists. The use of the acoustic emission sensor delivers indirect signals from which the wear behavior can be generated due to characteristic changes of the noise. But according to studies an acoustic emission sensor is not preferred to determine the moment of dressing. To map the measurements to parameters such as roundness or wheel dullness a model is used, which needs calibration for every grinding configuration.

From CN 105345663 a grinding wheel device is known capable of real-time monitoring of grinding conditions like wear, surface profile and roundness. The grinding wheel device comprises a grinding wheel body and attached to it a data acquisition module which is connected to an acoustic emission sensor, a grinding force sensor and a laser displacement sensor. Once again a model is needed to map the force and acoustic emission signals to wheel topography. This makes it infeasible for industrial applications where an enormous variety of different workpiece, tool and machine combinations with unknown properties are used.

In relation to automatic systems to measure tool wear non-contact remote sensing based on machine vision systems using optical sensors are used to measure the wear directly and indirectly. Generally, optical sensors are known to be small, lightweight, mechanical flexible and of low-cost sensor base material. Using fiber optic sensors requires a spectral read-out unit, as the sensing information is encoded. Typically, based on the total radiant energy received by an optical fiber the temperature of the workpiece and/or of the grinding wheel can be measured even though the workpiece is covered by the grinding wheel and the coolant lubricant during the grinding process. But in general the disadvantage of external mounted laser displacement sensors is that the influence of cooling lubricant is great as well as thermal and mechanical deviations of the machine cause displacement between the laser sensor and the wheel or tool.

Various sensing methods are developed in different technical fields whereby optical fibers provide sensing capabilities including fiber-optic interferometers. Known are non-contact optical sensing technology such as a low coherence interferometry. For example a Fabry-Perot interferometer consists of two optically parallel reflectors such as mirrors or interface of two dielectrics separated by a cavity and due to multiple reflections the reflected and transmitted spectrums are function of the cavity length and further parameters. Linear properties of optical fiber can be detected with high sensitivity by an interferometer, in particular the length of the optical fiber whereby one polished end of the optical fiber can be seen as reflector.

Based on the prior art, the object of the present invention is to provide a device and a method that allow a reliable process integrated examination of the machining tools such as a grinding wheel and/or cutting tool such as an insert during machining process with low cost elements. Furthermore, the device and the method are used to reliably determine and measure process parameters such as macroscopic and microscopic wear and recognition of the first touch of the machining tool such as an insert and/or a grinding wheel with the workpiece for setting process parameters like cutting speed.

BRIEF SUMMARY OF THE INVENTION

Advantageous embodiments of the tool device and the method are described in the claims.

The essential feature of the proposed solution is a tool device for machining a workpiece by cutting, milling, drilling or grinding, comprising a sensor for detecting a condition of the tool device during machining, wherein the sensor is connectable to a receiving unit, which transmits data to an analysis unit for analyzing the received data. The sensor is configured as a fiber optic sensor comprising at least one optical fiber providing an incident optical path and a reflected optical path for light beam emitted by a connectable light source and with a distal end thereof lying in a surface of the tool device and is configured such that the optical path length can be measured. Measuring the optical path length comprises as well determining a change in the optical path length.

In one embodiment the fiber optic sensor is an interferometric fiber optic sensor. The interferometric fiber optic sensor uses an interference between two light beams that are propagated through different optical paths provided by a single optical fiber or two different optical fibers. Such interferometric fiber optic sensor with optical fibers offering advantages such as easy multiplexing, mechanical flexibility and low-cost sensor base material. Optical fibers have been widely deployed owing to their good light guidance performance and other unique characteristics such as high sensitivity, low fabrication cost, small form factor, high accuracy.

The phenomenon of interference of light can be used for high precision measuring requiring beam splitting and beam combining components. Light beams emitted from a light source is transferred by the optical fiber whereby the optical fiber is not only used to transmit light signals but also as the sensing element. Interferometers give a lot of information as their signal. The measurement can comprise quantitatively determination by various means of detecting the changes in the wavelength, phase, intensity, frequency and/or bandwidth.

In one embodiment the fiber optic sensor is provided as an interferometric fiber optic sensor, utilizing optical interference to measure physical properties or to detect changes via the sensing system using fiber optic components. In a typical interferometric fiber optic sensor light is divided in at least two parts and at least one part of the light interacts with a quantity or physical effect intended to be measured. The interaction of the measurand results in a phase shift or modulation of the light which can be detected when the modified light interferes with reference light. Different types of interferometer are known used to generate interference by reflectors and/or splitter such as Michelson interferometer, Fabry-Perot interferometer and low coherence interferometer.

Fiber optic interferometric sensors can be of many configurations, one consists a Fabry-Perot interferometer providing a fiber optic sensor insensitive to changes in the intensity of optical signal in the transmission system because all the information about the measured values is induced in the frequency component of the measuring signal spectrum. Fabry-Perot interferometer (FBI) sensors can be classified into extrinsic and intrinsic ones. Extrinsic FBI sensor uses the reflections from an external cavity formed out of the interesting fiber and intrinsic FBI sensor has reflecting components within the fiber itself. The reflection or transmission spectrum of Fabry-Perot interferometer can be described as the wavelength dependent intensity modulation of an input light spectrum, which is mainly caused by the optical phase difference between two reflected or transmitted beams. The phase difference is influenced with the variation in the optical path length difference of the interferometer. According to the invention the fiber optic sensor designed as a Fabry-Perot interferometer sensor have a reflector formed within the fiber by means and methods known and a reflector provided by the distal end of the interesting fiber. Changes of the physical length between the reflectors results in phase variation and by measuring the shift of the wavelength spectrum of the Fabry-Perot interferometer a quantitatively measurement is obtained to determine the extent of wear of the contact zone of the tool device. During the machining process the rapid contact between the tool device such as the cutting tool or the grinding wheel and the workpiece generates a quasi-perfect section of the distal end of the embedded optical fiber in the contact zone such that this interface can be regarded as a reflector in the sense of the interferometer, in particular a Fabry-Perot interferometer. According to the change amount of length of the optical fiber calculated the wear in the contact surface, in particular the thickness of the abrasive layer of the grinding wheel can be measured or the change of the cutting edge can be determined.

A preferred embodiment of the interferometric fiber optic sensor is based on a low coherence interferometer using low-coherence light beam fed into an optic coupler that splits the light beam into two parts wherein one is directed at the tool surface and the other at a scanning reference mirror. The captured interference of the reflected light beams can be used to determine the precise position of the reflection point at the tool surface.

A receiving unit is provided to receive reflected or transmitted light and an analysis unit determines a change amount of a length of the optical fiber based on the strength of interference response and transmits the results to a control unit. The receiving unit can be provided on the rotating tool as well as the analysis unit and the control unit is apart from the rotating machine parts. Alternatively, the receiving unit, the analysis unit and the control unit are provided on non-rotating part of the machine and for transmitting the light signals a rotary joint for guiding the beam to the receiving unit is provided.

Transmitting the signals from the receiving unit to the analysis unit of the machine can take place wirelessly, from which the data are provided for further processing. Corresponding wireless transmission methods between relatively moving parts, in particular the rotating grinding wheel or rotating cutting tool and the stationary part of the machine are known in the art. For this purpose, for example an inductive signal transmission, a transmission by means of photosensitive sensors or a transmission by means of sliding contact are suitable.

The tool device can be a cutting tool with a geometrically defined cutting edge and for example a grinding tool with a geometrically undefined cutting edge. In the case of a geometrically defined cutting edge the tool device, in particular a cutting tool or an insert, has a base body and at least one cutting edge defined by an intersection between a rake face and a flank face of the cutting insert. In the case of a geometrically undefined cutting edge the tool device, in particular a grinding wheel, has a base body and an abrasive layer applied to the base body. The one or more optical fibers are integrated in the base body or attached to it and a distal end of the one or more optical fibers lies in a surface of the tool device such that the change of the condition of the tool device can be determined by measuring interference of emitted and received light beams. In one embodiment the distal end of the one or more optical fibers lies in the contact zone of the tool device with the workpiece, in particular in the abrasive layer of a grinding tool or in a face of the tool device defining a cutting edge of a cutting tool.

The optical fiber is embedded or attached to the base body of the tool in an accommodation designed in the tool device. Furthermore, the optical fiber extends as far as the surface of the tool, in particular in the case of a grinding tool the abrasive surface consists of grains e.g. silicon carbide, aluminum oxide, cubic boron nitride (CBN) or diamond and are embedded in a bonding material, e.g. metal, vitrified, resin or hybrid material. The abrasive surface shape depends on the grinding applications and can have various forms such as cylindrical or planar. A profile of the abrasive surface of a grinding tool may also be more elaborated for special grinding operation where the grinding wheel surface is an imprint of the finished workpiece such as in gear grinding. As in one preferred embodiment the optical fiber has a stiffness which is less than the stiffness of the surrounding material to prevent the optical fiber from being damaged during operation.

Since the use of fiber optic sensors allowing viewing of localized areas with a resolution limited by the numerical aperture and dimensions of the optical fiber several optical fibers preferably are provided to determine most of the abrasive surface of the grinding wheel or of the cutting edge of a cutting tool. To receive data of the condition of the grinding wheel or cutting edge multiple optical fiber can be provided, distributed over the surface area of the contact zone. In one embodiment the light beams emitted from the light source can be transmitted by a single optical fiber which is splitted into multiple optical paths each having a distal end in the surface of the tool device. The fiber optic sensors can be arranged such that the distal end thereof is arranged in the contact surface of the tool device with the workpiece and positioned such that substantially from the totality of the grinding wheel surface area or the cutting edge area information about the condition of the grinding wheel or the cutting tool, in particular of the thickness of the abrasive layer or the condition of the cutting edge can be generated.

Relating to the grinding process with geometrical undefined cutting edge, the wear of a grinding tool is not constant over the abrasive surface but varies due to the complexity of wear and its corresponding mechanisms as well as dynamical and tribological aspects of the process. According to the invention the grinding tool can be a grinding wheel and both are used herein in the same meaning. For accurate determination of the condition of the grinding wheel measuring the wheel topography is preferred to predicted or generated by a model. The use of fiber optic sensors arranged directly in the grinding wheel enables the monitoring of the change of the thickness of the abrasive layer during the grinding process directly in the contact zone. In one embodiment of the invention the tool device is a cup-shaped grinding wheel with at least four distal ends of optical fibers positioned in the abrasive layer perpendicular to each other. Using optical fibers to measure a profile of a tool multiple optical fiber distal ends are positioned in the contact zone. Therefore, the number and the positions of the distal ends of optical fibers can be vary in many ways. For example in some regions of the abrasive surface of the grinding tool multiple optical fiber distal ends are arranged close to another and in other regions only one optical fiber distal end is provided.

Furthermore, the method of the invention has the potential for the detection of numerous process and state variables that may be relevant for the machining operation, for example a grinding performance. The method can be used to determine an amount of wear of the surface of the tool device, dressing condition of the tool device, thickness of lubrication film, distance between workpiece and tool device and/or built-up edge of the tool device. For example the built-up edge can be seen as an accumulation of material against a rake face of a cutting tool which changes tool geometry and rake steepness. The benefits of fiber optic sensors are their small size, no electrical requirements at the point of measurement and a certain stability. The sensitivity of optical fibers is based on wavelength encoded qualities of interest which can transmitted without loss of fidelity over the length of fiber. Therefore, the tool device comprising multiple embedded optical fibers can be used to provide a system in which various information are directly and accurately recorded like heat generation, temperature and coolant layer.

Positioning a tool device such as a grinding wheel or a cutting tool involves detecting the moment of contact with the workpiece. Conventionally for grinding processes, acoustic emission sensors are employed that can detect the contact of grains of the grinding wheel with the surface of the workpiece. According to the invention a fiber optic sensor can be provided to determine the first touch of the tool device such as a grinding wheel or a cutting tool with the workpiece. For detection of the first cut the difference between the surface reflection of the tool and the workpiece is used according to the invention. Furthermore, during the machining process the position of the tool device is adapted such to provide a predetermined permanent superposition of engagements which can be determined as well via a fiber optic sensor.

To aim to maximize the production rate while maintaining specific product quality frame and to reduce the cost and time of the production simultaneously the topography of the real tool such as a grinding wheel or a cutting tool must be measured and analyzed to generate at least information useful for the dressing of the tool device. In one embodiment according to the invention the grinding wheel including the fiber optic sensor embedded provides grinding under optimum grinding condition without a complex system of different and independent sensors associated to the grinding machine.

A typical and important parameter to quantitatively describe grinding tool wear of a grinding process is the grinding ratio. It relates the volumetric ratio of workpiece material removed to volume of grinding tool consumed, in particular of abrasive wear. For example the grinding ratio depends on the wheel speed of the grinding wheel by a non-linear function. For optimizing of the grinding ratio the optical sensor according to the invention can be used since wear of the grinding tool or the grinding wheel is determined in real-time.

The grinding wheel according to one preferred embodiment of the invention is replaceable if the condition of the grinding wheel does not allow further dressing, sharpening and/or cleaning. Since the fiber optic sensor comprises a low-cost sensor base material the total costs of the grinding wheel comprising such fiber optic sensor is not further raised to conventionally use grinding wheels. According to the invention the abrasive layer with the at least one optical fiber are consumables but the base body of the grinding wheel including a bearing device to borne in a rotatable way about a grinding wheel axis and the receiving unit are part of the grinding machine. The grinding wheel can be designed as a cup-shaped grinding wheel driving in rotation by means of an electromotor. The cup-shaped grinding wheel consists of a grinding wheel cup on which an abrasive ring is placed having abrasive surfaces in different orientations.

Embodiments of the tool device according to the invention and of the method according to the invention will be explained more closely in the following by way of example, with reference to the attached drawings.

BRIEF DESCRIPTION OF THE DRAWINGS

FIG. 1 is a representation of the tool device according to the invention in a cross section view FIG. 2 is a representation of another embodiment of the tool device according to the invention in a cross section view;

DETAILED DESCRIPTION OF THE INVENTION

Figure 3:
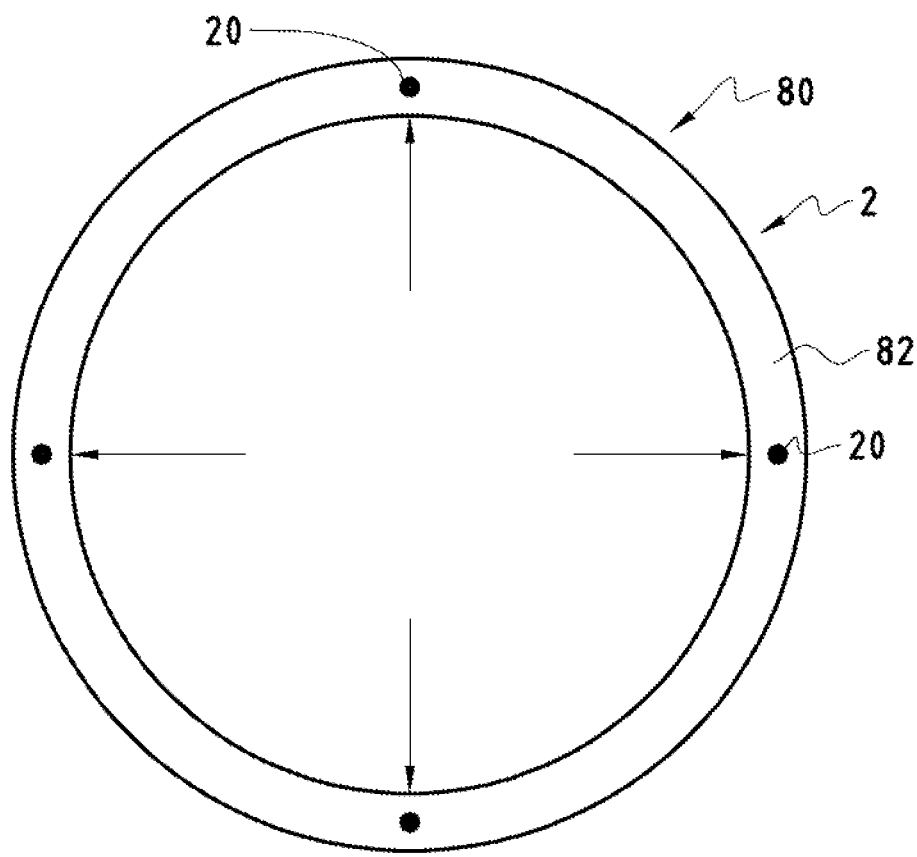
FIG. 3 is a representation of a cup-shaped grinding wheel as another embodiment of the tool device according to the invention in front view.

In FIG. 1, the tool device 1 can be seen in a cross section view as well as a workpiece 4. Shown in FIG. 1 is a grinding tool 2 such as a grinding wheel 2 comprising a base body 10 and an abrasive layer 12, consisting of a compound in which abrasive grains are embedded. The compound is of bonding material and is composed for example of metal alloy, of synthetic resin or of ceramic. Embedded in a known way in this bonding material are abrasive grains which can be made of diamond or another correspondingly suitable material. As can been seen from FIG. 1 embedded into the base body 10 are a fiber optic sensor 20, providing two optical paths, in particular a first optical path 22 and a second optical path 24, preferably provided as in-line structure offering two optical paths in one physical line, called fiber 26 to direct light beams emitted by a light source 30. The fiber optic sensor 20 is fabricated from low-cost base material, typically silica and can be used in harsh conditions. Further developments like polymer fiber optic sensors are known. To miniaturize the fiber optic sensor 20 based on fiber optic interferometers optic components such as beam splitters and combiners, small-sized fiber devices are used to enable the fiber optic sensor 20 to operate on fiber scale. The first and second optical paths 22, 24 can be arranged into an accommodation 16 provided in the base body 10 and the abrasive layer 12, whereby one distal end of the first and second optical paths 22, 24, respectively, lies in a surface of the abrasive layer 12, in particular in a tool surface 14 providing a contact surface to a workpiece 4 to be machined.

According to the invention the fiber optic sensor 20 is based on low-coherence interferometry comprising an interferometer, preferably a low-coherence interferometer. Light beam from the light source 30 is fed into an optic coupler 32 that splits the light beam into two paths, one directed at the tool surface 14, and the other to a reference surface. The interference of the light rays reflected back from the two paths are captured for example by a detector and analyzed by an analysis unit 50. Interference occurs due to the multiple superposition of both reflected and transmitted beams at the two parallel surfaces. The interferometer uses the reflections from an internal reflector and from the distal end of the fiber 26. According to the high performance of the tool device 1 the machined surface of the fiber 26 can be used as reflector such as reflecting mirror of the interferometer.

During the machining process the tool device 1 wears due to mechanical, physical and chemical effects and the machining ability of the tool device 1 decreases. As shown in FIG. 1, during the machining process, in particular the grinding process of the grinding wheel 2, the fiber optic sensor 20 is exposed as well to mechanical, physical and chemical effects as the tool surface 14 resulting in a change of length of the fiber 26 or the optical path length. By this an associated receiving unit 40 receives profile data of the surface of the grinding wheel 2 collected by the fiber optic sensor 20, i.e. a detector and transmits the data to the analysis unit 50 connected to a control unit 60.

FIG. 2 shows another embodiment of the tool device 1. Shown is a cutting tool 3 such as a cutting insert. The cutting tool 3 has a base body 10 and comprises a fiber optic sensor 20 for detecting wear of the cutting insert caused by operation thereof on the workpiece 4, wherein the fiber optic sensor 20 comprises a fiber 26 providing a first optical path 22 and a second optical path 24. The tool device 1 comprises a cutting edge 70 defined by an intersection between a rake face 72 and a flank face 74 of the cutting tool 3. As shown in FIG. 2 the fiber optic sensor 20 is accommodated in the accommodation 16 provided in the base body 10 of the cutting tool 3 and fixed in an appropriate manner. In one embodiment the fiber 26 of the fiber optic sensor 20 has one distal end of the provided optical paths 22, 24 lying in the plane of the flank face 74. As indicated by arrows light beams escape and enter the distal end of the fiber 26. According to the shown embodiment the fiber optic sensor 20 is a low-coherence interferometry sensor using an interferometer in reflective mode, e.g. reflections from an external cavity, in particular configured by the flank face 74 and a surface of the workpiece 4 to be machined. Since this air cavity is defined by the cutting edge 70 it can be utilized to determine wear of the cutting edge 70 resulting from the change of physical length of the cavity, which results in phase variation to be measured.

Shown in FIG. 3 is a front view of a grinding wheel 2 cup-shaped. The grinding wheel 2 comprises in generally a grinding cup, on which an abrasive ring 80 is placed having an annular abrasive surface 82 and an abrasive surface in the shape of lateral area (not shown). To determine wear of the grinding wheel 2, in particular wear of the annular abrasive surface 82, used to decide whether the abrasive layer is sufficiently good for grinding it is preferably to have information about the condition of the totality abrasive surface or at least of a multiple of abrasive surface areas. Therefore, more than one fiber optic sensor 20 can be used for detecting the condition of the abrasive surface 82. According to a preferred embodiment of the invention at least four fiber optic sensors are provided positioned at determined positions.

Figure 4:
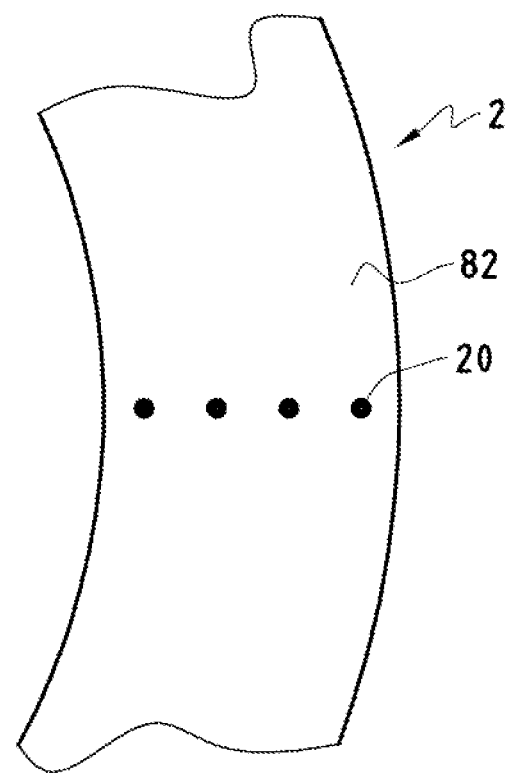
FIG. 4 is a representation of a cup-shaped grinding wheel as another embodiment of the tool device according to the invention in front view.

According to FIG. 4 a detail front view of a cup-shaped grinding wheel 2 is shown. During grinding process the loads applied to the grinding wheel 2 effect wear, where macro wear relates to deterioration of the macro geometry comprising radial wear and edge wear and leads to a change in profile, size errors and runout. To determine the grinding wheel 2 topography multiple fiber optic sensors 20 are provided in the abrasive surface 82 of the cup-shaped grinding wheel 2, in particular positioned in an area of the abrasive surface 82 such that radial wear but as well as edge wear can be determined. The profile data obtained are important in conditioning processes for preparation and regeneration of the grinding wheel macro and micro geometry influencing the grinding wheel 2 topography.

Figure 5:
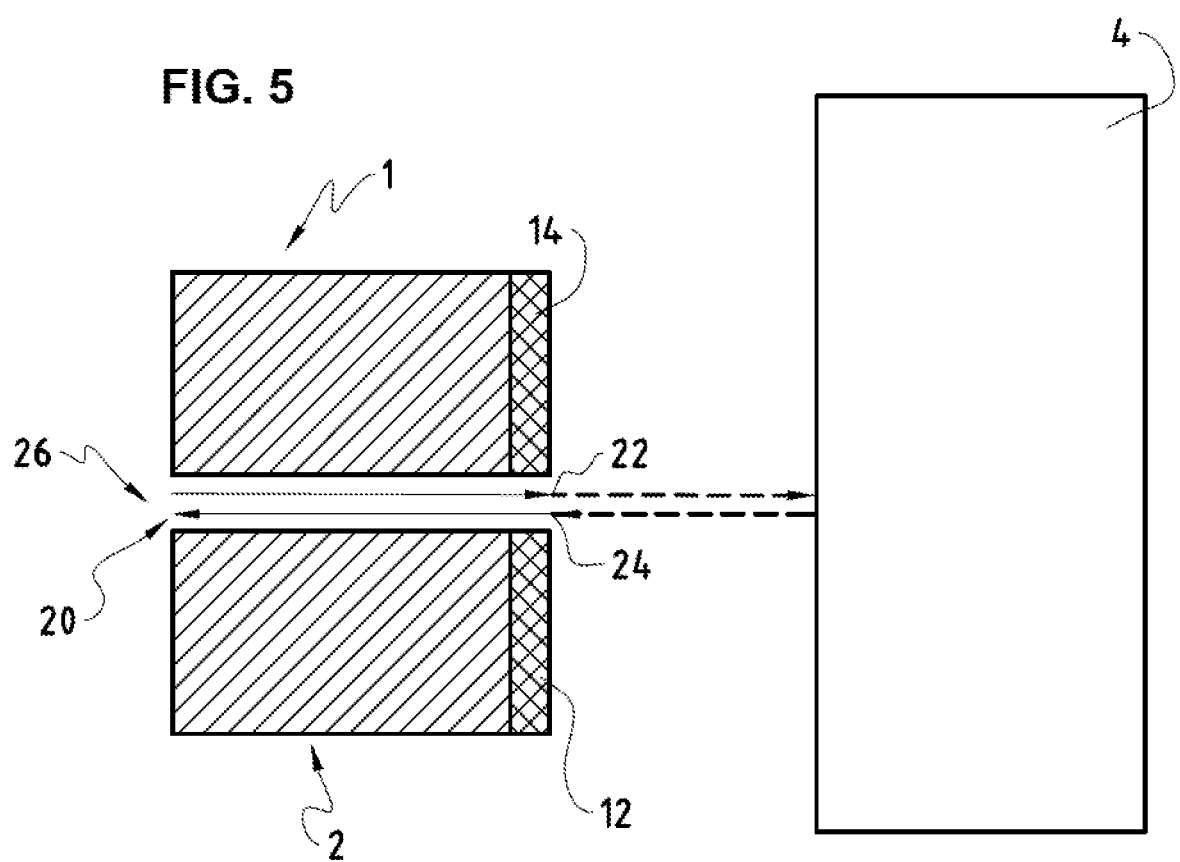
FIG. 5 is a representation of the tool device according to FIG. 1 to detect a first cut.

As can be seen from FIG. 5, the tool device 1 with the embedded fiber optic sensor 20 comprising fibers 26 is configured to determine further parameters relevant for the machining process. As one example the fiber optic sensor 20 can be used to determine the distance between the surfaces of the tool device 1, in particular the abrasive surface 14 of the abrasive layer 12 of a grinding tool 2, in particular grinding wheel 2, and of the workpiece 4 before the start of a grinding operation to ensure the right position relative to each other and to detect the first cut.

The invention claimed is:

1. A tool device for machining a workpiece by cutting, milling, drilling or grinding, comprising:
   a sensor for detecting a condition of the tool device during machining, wherein the condition comprises one or more of: an amount of wear of the tool device, a dressing condition of the tool device, a thickness of a lubrication film, a distance between the workpiece and the tool device, and/or a built-up edge of the tool device,
   wherein the sensor is connectable to a receiving unit, which transmits data to an analysis unit for analyzing the received data,
   wherein the sensor is configured as a fiber optic sensor comprising at least one optical fiber providing at least one incident optical path and at least one reflected optical path for light emitted by a connectable light source, a distal end of the at least one optical fiber lying in a surface of the tool device in a contact zone with the workpiece such that an optical path length of said at least one reflected optical path can be measured from light reflected off an external surface adjacent to the distal end of the at least one optical fiber and/or from an internal reflection within the at least one optical fiber,
   the analysis unit being configured to determine said condition of said tool device as a function of said at least one optical path length.

2. The tool device according to claim 1, wherein the fiber optic sensor is an interferometric fiber optic sensor.

3. The tool device according to claim 2, wherein the interferometric fiber optic sensor uses an interference between two light beams that are propagated respectively through the at least one incident optical path and the at least one reflected optical path, which are provided by a single optical fiber or two different optical fibers among the at least one optical fiber.

4. The tool device according to claim 2, wherein the interferometric fiber optic sensor is a low-coherence interferometry sensor.

5. The tool device according to claim 1, wherein the tool device is configured as a grinding tool for grinding a workpiece and wherein the distal end of the at least one optical fiber lies in an abrasive surface of the grinding tool.

6. The tool device according to claim 1, wherein the analysis unit determines an optical phase difference between two light beams, reflected at reflectors, whereby one said reflector is provided by the distal end of the at least one optical fiber.

7. The tool device according to claim 6, wherein a second said reflector is a reference surface.

8. The tool device according to claim 1, wherein the analysis unit determines an optical phase difference between two light beams, reflected at reflectors, whereby one said reflector is provided by said external surface, which is a surface of the workpiece.

9. The tool device according to claim 8, wherein the tool device is configured as a cutting tool comprising a rake face and at least one flank face intersecting the rake face and defining a cutting edge, and wherein the distal end of the at least one optical fiber lies in the flank face of the cutting tool.

10. The tool device according to claim 8, wherein a second said reflector is a reference surface.

11. The tool device according to claim 1, wherein the at least one optical fiber is embedded in an accommodation provided in the tool device and held in place.

12. The tool device according to claim 1, wherein the at least one optical fiber provides first said incident optical path and a first said reflected optical path in one physical line.

13. The tool device according to claim 1, wherein the fiber optic sensor comprises a beam splitter for splitting a light beam from the light source into different fibers of said at least one optical fiber, with respective distal ends thereof positioned in the tool surface in spaced areas.

14. The tool device according to claim 1, said analysis unit being further configured to transmit to a control unit for said tool data relating to said condition of said tool.

* * * * *